Patented Apr. 14, 1931

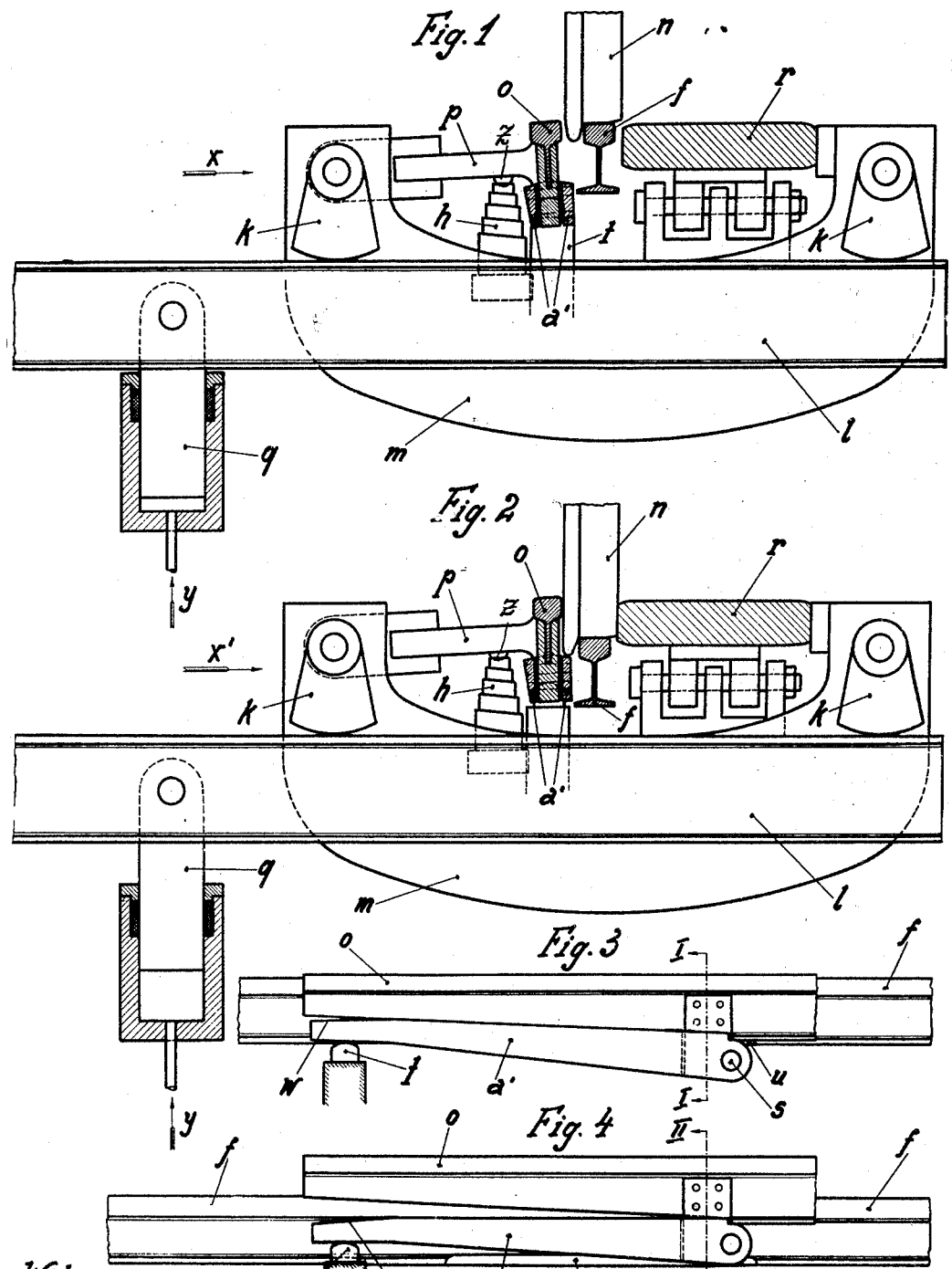

1,800,895

UNITED STATES PATENT OFFICE

JAKOB MAY, OF COLOGNE, GERMANY

RAIL BRAKE

Application filed May 17, 1927, Serial No. 192,060, and in Germany May 22, 1926.

The present invention relates to an improved rail brake comprising a transition lever for obviating the sudden shocklike transmission of the wheel pressure to the brake, and the novelty consists more particularly in the improved connection of said transition lever and of the several constructional parts of said rail brake.

The accompanying drawing illustrates the improved rail brake.

Figs. 1 and 2 show two end views of the rail brake in its inoperative and operative position respectively, partly in cross section, on the lines I—I and II—II of Figs. 3 and 4 respectively, while Figs. 3 and 4 are side views corresponding to the two former figures, seen in direction of the arrows $x$ and $x'$ respectively.

As shown in the drawing $p$ and $r$ are both brake carriers arranged along every rail track. Of these $r$ is the firmly arranged carrier for the outside brake, while the carrier $p$, to which the braking rail $o$ is attached, is arranged movably and supported near the rail track $f$ by a spring $h$. Brake carriers $p$ and $r$ are connected to one another by bridles $m$, which latter rest with segments $k$ on horizontal arranged I-beams $l$. By hydraulic pressure, for instance by a piston $q$, the I-beams $l$ and also the brake carriers $p$ and $r$ maye be lifted up and down. $a'$ is the shock neutralizing transition lever, which, according to the invention, is inserted in the up and down movable braking rail $o$ and attached thereto as afterwards described.

Prior to the wheels of the vehicle on the rail track $f$ encountering the rail brake, the braking rail $o$ attached to the fulcrumed lever $p$ as well as the counter-rail $r$ can be so lifted by means of the hydraulic contrivance acting in the direction of arrows $y$, that the flange of wheel $n$ runs upon the foot of the braking rail $o$ and is thus forced by the pressure of the wheel itself between the head of the braking rail $o$ and the counter-rail $r$ and thereby braked. The running of the wheels onto the raised brake is ensured in that on the one hand the braking edges of the inner braking rail $o$ and of the outer braking rail $r$ have been drawn apart wedge-like and on the other hand the braking rail $o$ is bent vertically in the vertical plane such a distance, that the wheel even at the greatest height of wheel flange can run on surely onto the foot of the oscillatably mounted brake rail $o$. After the running on the oscillatably mounted inner brake carrier $p$ is depressed until the braking rail $o$ comes to bear with its braking edge on the inner surface of the wheel, the outer rail $r$, owing to the rigid connection with the inner rail $o$ and the carrier $p$, being brought by means of the bow $m$ to bear against the outer surface of the wheel. The lever principle further shows that the closed circuit to the tread takes place sooner or later according to its thickness, that is that the oscillating course of the braking rail $o$ is different. A thick tread consequently leads earlier to the closed circuit so that at variable control pressures on the pistons, as long as they are below the maximum pressure corresponding to the axle weight, the entire system is depressed and the fulcrum $z$ of the oscillatable rail assumes therewith a certain height position relative to the upper edge of the rail, according to the closed circuit. With maximum pressure the wheel is lifted accordingly off the track rail, so that the entire wheel weight is converted into pressing on force according to the lever ratio. The thinner the tread is, the smaller will be the vertical downward movement of the carrier system at closed circuit, i. e. the thinner the tread, the higher the fulcrum $z$ of the oscillatably mounted brake carrier $p$ will be situated relative to the upper edge of the track rail.

At closed circuit a sudden vertical loading of the hydraulic lifting device occurs and the braking force is also directly engaged with its actual maximum strength. By this means and owing to the wheel running on the braking edges drawn apart conically, shock-like forces are produced, which are undesirable both for the brake as also for the car. Consequently the reducing of this undesirable stressing constitutes an important technical progress, the attaining of which is the object of this invention.

According to the invention, a shock neutralizing transition lever a' is inserted in the vertically movable braking rail o and it is attached thereto at one end by means of a link s, its other end bearing freely upon a fixed foundation bearing t located adjacent the end of the braking rail o. For the reception of said transition lever a' the foot of the braking rail o, which latter consists of a normal section of a rail, is cut away at both ends from the fastening place of the lever a' until to its end, whereby the web of the lever o is inclined in longitudinal direction corresponding to the position of the lever a' shown in Fig. 3. Furthermore, the foot of the rail track f has a recession u of about the length of the lever a' in order to warrant a frictionless working of the lever a'. The transition lever a' consists of a cast steel beam. The fixed bearing t is arranged at such a height that the lever in the braking position (Fig. 4) lies horizontally on a level with the cut-away portion rail foot, so that the flange of the wheel n runs upon the same (Fig. 2). In the inoperative position (Figs. 1 and 3), however, the lever a' assumes an inclined position so that its linked end is downwardly directed, whereby the other lever end extending beyond the fixed bearing t lies somewhat higher than in the braking position. This end of the lever is flattened or rounded on its upper surface at w in order to prevent a wheel flange running thereon when the braking rail o is not raised. The flattening or rounding portion w ensured further a shockfree running of the wheel flange onto the rail brake, when the braking rail is lifted. As the braking rail o when the rail brake is in operative position, performs beside its vertical movement also a slight horizontal movement due to the turning of the lever p, it follows that the transition lever a' must be adapted to follow this double movement. For this reason the fixed bearing t is hemispherical.

With the improved arrangement, the braking is not effected in a sudden and shocklike manner but gradually and uniformly increases from zero to full load, the horizontally or obliquely directed braking and other forces being likewise transmitted gradually, both to the track as well as to the vehicle. Any shocklike stress upon the hydraulic lifting contrivance is thus avoided, and no shock-like forces act upon the foundation of the brake or upon the vehicle.

What I claim, is:

The combination, in a rail brake, of an up and down movable braking rail having at both sides a recessed foot portion, a movable shock neutralizing transition lever inserted in the latter and at one end linked to said rail, a fixed hemispherical bearing adjacent the free end of said braking rail for freely supporting the other end of said lever in horizontal position with raised braking rail, and a flattened portion on the upper surface of said lever at its bearing-supported end.

In testimony whereof I have hereunto set my hand.

JAKOB MAY.